March 19, 1968  H. TOPSØE ET AL  3,374,061

PROCESS FOR OBTAINING SULFURIC ACID

Filed Jan. 31, 1967

INVENTORS
HALDOR TOPSØE
GERARD THAREAU

BY
OSTROLENK, FABER, GERB & SOFFEN
ATTORNEYS

United States Patent Office 3,374,061
Patented Mar. 19, 1968

3,374,061
PROCESS FOR OBTAINING SULFURIC ACID
Haldor Topsøe, Vedbak, Denmark, and Gerard Thareau, Aubervilliers, France, assignors to Societe Nationale des Petroles d'Aquitaine, Paris, France
Continuation-in-part of application Ser. No. 388,808, Aug. 11, 1964. This application Jan. 31, 1967, Ser. No. 613,981
Claims priority, application France, Aug. 13, 1963, 944,563
6 Claims. (Cl. 23—167)

ABSTRACT OF THE DISCLOSURE

A process and apparatus for the manufacture of sulphuric acid by absorbing a hot, humid gaseous stream containing sulphuric oxide in an aqueous sulphuric acid solution, the volume and concentration of which are maintained constant throughout the process. The sulphuric acid solution is continuously recycled through the absorber zone and the temperature of the recycled stream adjusted to maintain the sulphuric acid concentration therein constant. A volume of the sulphuric acid solution equal to the incremental portion formed by absorption of $SO_3$ and water vapor from the gaseous feed stream is continuously removed from the absorber, thereby maintaining the volume of the sulphuric acid solution recycled through the absorber substantially constant. The incremental volume of sulphuric acid is continuously recovered and concentrated to the required degree by flow countercurrent to the hot gaseous feed stream prior to contacting the latter with the sulphuric acid solution in the absorber.

---

This application is a continuation-in-part of our copending application Ser. No. 388,808 filed on Aug. 11, 1964, and now abandoned.

The invention relates to an improved process for obtaining sulphuric acid from dilute, sulphuric anhydride-containing inert gases. More particularly, it relates to the absorption of $SO_3$ from gaseous feed streams employing concentrated aqueous solutions of sulphuric acid, and to the concentration of the solutions thus formed. A further feature of the invention involves the combination of various operations utilized in connection with the absorption-concentration procedure hereof to provide a new process for the manufacture of sulphuric acid from various sulphur compounds which exist in varying concentrations in gaseous feed streams.

It is known to transform various sulphur compounds contained in differing dilutions in air, industrial fumes or vapors, or other gases into sulphuric acid. Conventionally, such compounds are oxidized to the $SO_3$ state, and the sulphuric anhydride is thereafter absorbed by a sulphuric acid solution. Such technique is, for example, applicable to the recovery of sulphur per se, which may exist in petroleum derivatives, in off gases produced during the manufacture of sulphur by the Claus process or in other sulphurous gases or vapors.

Various substantial problems are, however, inherent in the absorption of sulphuric anhydride in accordance with conventional operations. Thus, since $SO_3$ must generally be absorbed from gaseous streams in which it exists in very low concentrations, previous processes have required the use of inordinately large capacity equipment. Moreover, the use of such techniques has necessitated special installations to prevent entrainment of the sulphuric acid solutions by the large volumes of gaseous streams contacted therewith. Additionally, since it is desirable to carry out such procedures employing sulphuric acid solutions of relatively low concentrations, heating requirements have imposed substantial limitations thereon.

It is accordingly among the objects of the present invention to provide a process for the economical production of sulphuric acid of high concentration, directly from gaseous streams having low $SO_3$ contents.

An additional object of the invention is to provide such a process which may be employed to recover sulphuric anhydride from gaseous streams, irrespective of the origin of such streams, and without additional heating expense for the concentration of the sulphuric acid product.

Yet a further object of the invention is to provide such a process by which the concentrated sulphuric acid product may be economically obtained, without the use of inordinately high capacity equipment or the provision of elaborate apparatus for obviating vesicular entrainment of the acid.

It is a further object of the present invention to provide an apparatus for producing sulphuric acid by the aforesaid process in large-scale, commercial operations in an economical and efficient manner.

Other objects and advantages of the invention will be apparent from a consideration of the following detailed description thereof.

In accordance with the present invention, a hot, humid gaseous stream containing sulphuric oxide is continuously passed through an absorber countercurrent to an aqueous sulphuric acid solution, $SO_3$ and water vapor being absorbed by the solution to form an incremental volume of sulphuric acid. The sulphuric acid solution is continuously recycled through the absorber and, by regulating the temperature of the recycle stream, the concentration of the sulphuric acid solution is maintained substantially constant. The incremental volume of sulphuric acid formed in the absorber is continuously removed therefrom (thus maintaining a constant volume in the sulphuric acid stream recycled through the absorber), and is then passed through a concentrator counter-current to the $SO_3$-containing gaseous stream, prior to the introduction of the later into the absorber.

We have found that by thus maintaining the concentration and volume of the sulphuric acid solution constant, it is possible to effect the unobvious and superior results of the present invention. Specifically, the indicated procedure may be utilized to produce highly concentrated sulphuric acid products, e.g., 94% $H_2SO_4$, employing dilute gaseous feed streams containing, for example, only from about 0.5% to 2% by volume of $SO_3$, and absorbing such streams in sulphuric acid solutions having concentrations of from about 75% to 90% by weight. The process hereof is applicable to $SO_3$-containing gaseous streams, regardless of the origin of the sulphuric anhydride. It is particularly useful in the treatment of gases obtained from Claus sulphur units, which may have sulphur compound contents of the order of only 1.5% by volume. Employing such gases, it is preferred to effect the preliminary conversion of sulphur compounds to sulphuric anhydride in accordance with a particularly economical procedure forming a subsidiary object of this invention and described more fully hereinafter.

In accordance with the present invention all of the $SO_3$ in the gaseous feed stream employed is absorbed by the sulphuric acid solution within the absorber zone without the addition of fresh sulphuric acid to the liquid stream. Moreover, by solely removing the incremental portion of the sulphuric solution formed in the absorber and passing the same counter-current to the incoming gaseous stream, efficient heat recovery is effected. In this manner the latent heat of the incoming gaseous stream is utilized to concentrate the sulphuric acid solution (by evaporation of a portion of its water content), thus reducing over all process heating costs.

In a preferred form of the process of the present invention the hot gaseous feed stream, from which $SO_3$ and water vapor is to be absorbed, is brought into intimate countercurrent contact in the absorber zone with a sulphuric acid liquid stream of constant volume and concentration. The amount of the sulphuric acid brought into contact with the gaseous feed stream per unit of time is desirably equal to the volume of sulphuric acid formed in the absorber per unit of time by absorption of $SO_3$ and water vapor from the gaseous stream. By continuously removing an equal quantity of the sulphuric acid solution, viz, a quantity equal to the volume of acid formed in the absorber, and permitting such stream to flow through the concentrator, the volume of sulphuric acid recycled through the absorber circuit remains constant.

In some cases it may be desirable to cause the gaseous stream undergoing treatment to act successively upon two or more masses of sulphuric acid solution in successive absorber zones. In such instance, the first of the sulphuric acid masses is the most highly concentrated, the succeeding mass or masses having decreased concentrations. For example, the feed gases may initially contact an 85% $H_2SO_4$ solution, and thereafter contact a second, 75% $H_2SO_4$ solution. The incremental portion of sulphuric acid produced by absorption from the first of such sulphuric acid masses is permitted to flow to the concentrator zone for formation of the product stream, whereas the incremental sulphuric acid fractions formed in the second and subsequent absorbers may be cycled to the first and succeeding absorber zones, respectively.

Whether one or more absorber zones is utilized, it is nevertheless essential to maintain the concentration(s) of the sulphuric acid solution(s) recycled through the absorber or absorbers at a substantially constant value. Such concentration control is effected by providing cooling means in the respective recycle conduits leading to the individual absorber or absorbers. Cooling of the recycled stream effects condensation of water vapor from the gaseous phase in equilibrium therewith, thus offsetting the increase in concentration resulting from absorption of $SO_3$ from the gaseous stream. If, on the other hand, the sulphuric acid solution concentration in the recycled stream falls below a pre-determined value, the cooling is reduced, additional water vapor escaping from the liquid stream into the vapor phase and increasing the concentration of the sulphuric acid solution to maintain the same within the pre-determined tolerances. By thus maintaining the concentration of the recycled sulphuric acid stream substantially constant, either at a pre-determined value or within a pre-determined range of values, the continuing introduction of fresh sulphuric acid solution or the use of large reaction systems is obviated.

According to a further and subsidiary feature of the invention, the heat absorbed by the mass of sulphuric acid solution from the $SO_3$-containing gaseous stream is eliminated from the working medium and recovered, for example, by exchange with de-mineralized water intended for feed boilers. Such heat exchange is conducted, as noted above, in such a manner that the sulphuric acid solution recycled is continuously cooled to the pre-determined temperature value before again contacting the $SO_3$-containing feed gas stream. In one particular embodiment, utilized for the absorption of $SO_3$ and water vapor from a humid gas containing from 0.8% to 9% by volume of $SO_3$, employing a mass of an 85% sulphuric acid solution, the temperature of the sulphuric acid solution is cooled during recycle from about 155°–165° C., after contacting the $SO_3$-containing gaseous stream, to 90°–95° C., prior to again being introduced into the absorber zone for further reaction.

The incremental liquid fraction formed in the absorber zone is, as noted, brought into intimate countercurrent contact with the gaseous feed stream prior to flow of the latter through the absorber. The liquid stream is thus concentrated as desired and recovered as end product. Since the $SO_3$ contained in the gaseous stream is subsequently absorbed in the absorber, no disadvantages result from entrainment in such stream of a portion of the acid brought into contact therewith in the concentrator. Accordingly, no special techniques or installations need be provided for avoiding entrainment in such zone.

It is preferred that the $SO_3$-containing gaseous feed stream fed through the absorber be at, or only slightly above, its dew point when introduced into the absorber zone, in order to facilitate total absorption of the $SO_3$ content thereof. Accordingly, the temperature of the feed gas stream is lowered, prior to introduction thereof into the concentrator, in order that the stream temperature, after passage through the concentrator and prior to introduction into the absorber, will be regulated as indicated. Preferably, the gaseous stream is thus cooled by passage over the tubes of a boiler for the production of steam for use in other parts of the installation or, as may be otherwise desired.

As indicated above, the process of the present invention may be advantageously applied to the production of sulphuric acid from sulphur compounds contained in residual gases recovered from the Claus units of a sulphur plant. For such application, it is preferred to employ the following operational steps: combustion of the sulphur compounds to $SO_2$ jointly with the combustion of a hydrocarbon gas; recovery of the heat thus produced; catalytic conversion of the $SO_2$ which is obtained into $SO_3$; cooling of the gases containing this $SO_3$ to the region of their dew point and recovery of the heat given off; use of the still hot gases for concentrating the sulphuric acid solution produced in a subsequent absorption phase; finally, the action of these gases on a mass of sulphuric acid in excess with a view to absorbing $SO_3$ and water vapor.

An apparatus, according to the invention, comprises at least one concentrator, which is a chamber with an internal lining or plates, of which the lower part is connected to a conduit for the supply of gas to be treated and to a liquid outlet pipe, while the top of the chamber is provided with a gas outlet and a pipe for the supply of sulphuric acid solution which originates at the bottom of an $SO_3$ absorption tower.

In one preferred embodiment, the gas supply passes through a heat exchanger in such a way that the gas can give off some of its heat to an external fluid, such as the water of a boiler.

The exchanger is preferably formed by a water boiler, the drum of which is connected at the other end to one or more other exchangers recovering the heat from other apparatus, particularly from one or more burners for sulphur compounds.

The sulphuric anhydride absorber used in the present invention is a tower having filler elements or plates. An inlet for the gases to be treated is connected to the outlet of the concentrator as set forth above. Means for the circulation of liquid are connected between an outlet at the bottom of the absorber and at least one inlet at the top of this apparatus. These means preferably comprise one or more heat exchangers and a liquid supply conduit at the bottom of the absorber, provided with flow-regulating means, connected to the top of the concentrator.

The assembly formed by the absorber, the concentrator, and the heat exchanger above the concentrator, as hereinbefore described, constitutes a new arrangement which forms part of the present invention.

One special installation, according to the invention, for converting gases containing sulphur compounds into sulphuric acid comprises the aforementioned assembly, preceded by an incinerator, and a converter of $SO_2$ to $SO_3$, the gas outlet conduit of the converter terminating at the exchanger disposed above the concentrator.

In one particularly advantageous embodiment of this special installation, the incinerator comprises a burner of hydrocarbon fuel, for example, fuel gas, and at least one heat exchanger, particularly the water circulation tubes of a boiler. Two successive exchangers are preferably arranged in the region of the smoke outlet of the incinerator, one acting as a steam superheater of the boiler which constitutes the second exchanger.

Any converter of known type can form part of the installation. Particularly favorable results are obtained when the catalytic mass is disposed in this apparatus in several successive layers which are separated by free spaces. There is thus avoided the tendency to the formation of chimneys within the catalyst during the passage of the gases which are to be converted.

One installation, according to the invention, is shown diagrammatically and as a non-limiting example in the accompanying drawings.

Figure 1:
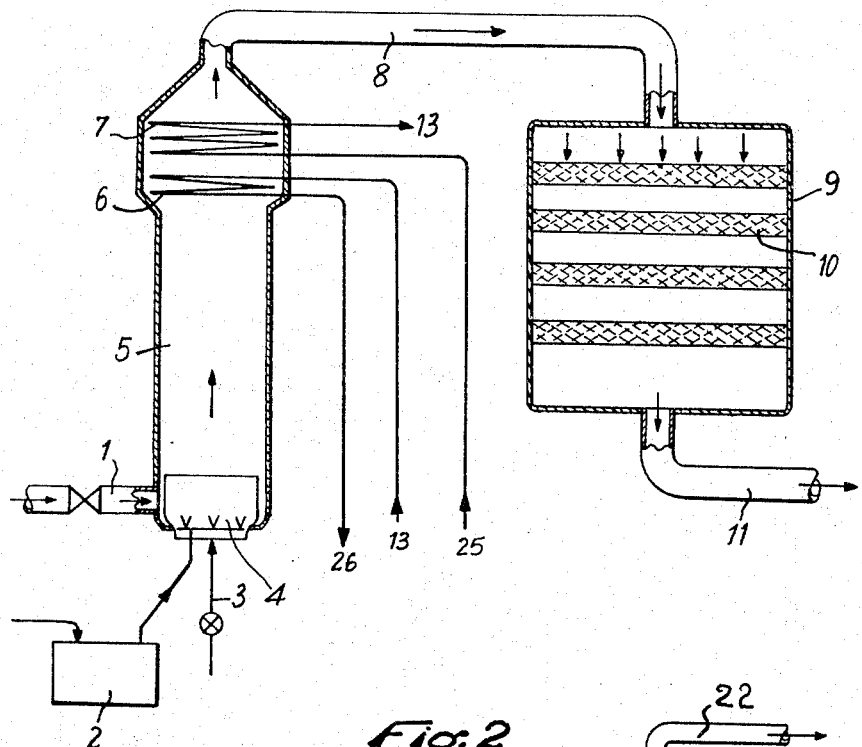
FIGURE 1 shows diagrammatically an incinerator for sulphur compounds, followed by a converter of $SO_2$ into $SO_3$.
Figure 2:
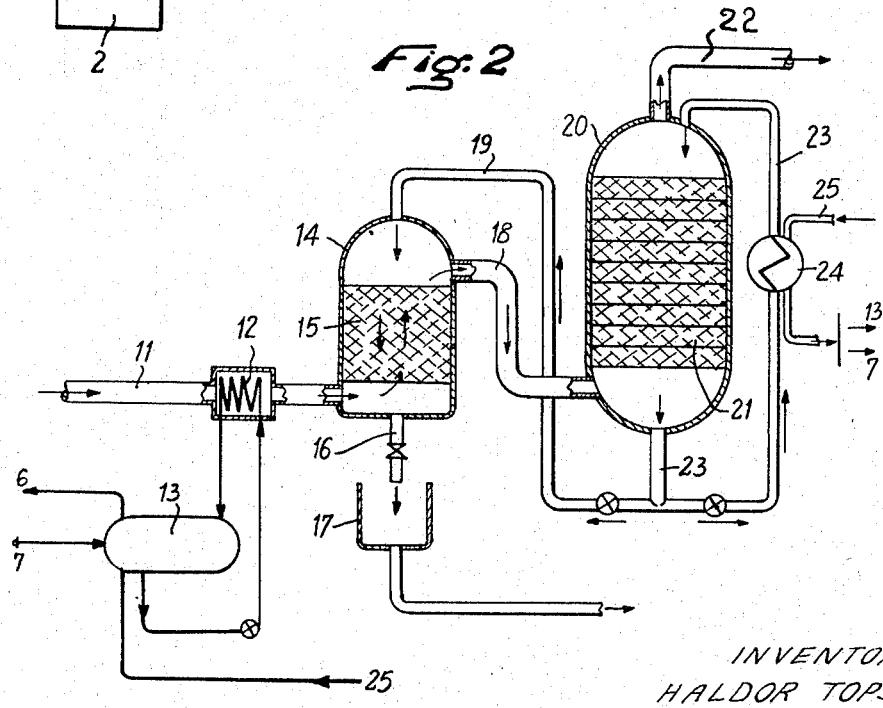
FIGURE 2 is a diagrammatic view of the part of the installation in which the absorption of $SO_3$ and water and the concentration of the sulphuric acid solution which is produced takes place.

By way of the conduit 1 shown in FIGURE 1, the gas to be treated reaches the bottom of the incinerator 5, in which is disposed a burner 4. The burner receives fuel, for example, natural gas, from a tank 2, and air which is blown in through the duct 3. Situated in the upper part of the incinerator are the tubes 6 of a heat exchanger supplied with the steam coming from the drum 13 of a boiler (FIGURE 2), which will hereinafter be referred to. This exchanger functions as a superheater, and some of the steam which it supplies is used at 26.

A second exchanger 7 is provided, the tubes of which are fed with demineralized water from a conduit 25 (FIGURE 2), preheated in a graphite exchanger 24. The steam produced in the exchanger 7 is sent to the drum 13 already referred to above.

The top of the incinerator 5 is connected by a pipe 8 to the inlet of a reactor or converter 9, in which the reaction $SO_2 + \frac{1}{2} O_2 = SO_3$ takes place on catalytic masses 10 disposed in several layers which are separated from one another by free spaces.

From the converter 9, the gases pass through the conduit 11 into the exchanger 12 formed by a boiler. The conjugation of the exchange 12 with the concentrator 14 permits the gases to be cooled in two stages; first, for the production of steam in 12, and then for the concentration of the acid solution in 14. This latter makes it possible to have gases at a temperature higher than their dew point at 12, whereby any condensation on the tubes of the boiler is avoided and the latter is thus protected against corrosion.

The drum 13 of the boiler is fed with demineralized water from the distribution pipe line 25; as already indicated above, it is also connected to the exchangers 6 and 7, thus making it the central member of the entire system for recovering heat and for regulating the temperature at the various positions in the installation.

The concentrator 14 is a chamber provided internally with Raschig rings 15, other filler elements or plates. It receives the gases through the conduit 11 opening into its bottom part; the gases leaves through the conduit 18 which is disposed above the Raschig ring lining 15. The sulphuric acid solution to be concentrated is introduced through the pipe line 19 connected to the top of the chamber 14; after having flowed counter-current to the hot gases through the packing 15, this liquid leaves in concentrated form through 16, and it is collected in a tank 17, where it can be cooled by mixing with the cold acid.

The absorber 20 is formed by a tower containing filler bodies, such as Raschig rings 21. The gases containing $SO_3$ and water to be absorbed arrive at the bottom end through the conduit 18. They flow through the filler bodies 21 counter-current to the sulphuric acid solution injected at the upper end and leave by way of 22 to pass towards the chimney after a portion of the $SO_3$ and water vapor contained therein is absorbed. The sulphuric acid solution for absorption purposes continually circulates through the absorber and the pipe line 23. The pump which insures this circulation must have a large delivery, in order that the hourly rate of flow of the absorption solution is much greater than the liquid fraction produced, which is sent through the pipe line 19 into the concentrator 14. The liquid flow through the absorber is preferably 20 to 30 times that of the liquid fraction produced, flowing through 19 and 16.

The essential function of absorber 20 is to take $SO_3$ and $H_2O$ from the gases which circulate counter-current to the mass of sulphuric acid, while the concentration of the latter is maintained constant. This is accomplished by adjusting the temperature of the acid mass recycled through the absorber so that the amount of water and $SO_3$ simultaneously absorbed is substantially that which is necessary to form an incremental portion of acid of a concentration equal to that of the recycled mass. In this manner, the concentration of the recycled mass is likewise maintained constant.

If the concentration of acid in the absorber increases above a predetermined percentage, the acid passing through the heat exchanger 24 is cooled. Cooling of the recycled mass lowers the vapor pressure in the system, thus decreasing the amount of water escaping with the off gases through conduit 22. The concentration of acid subsequently formed will decrease.

Conversely, when the concentration of acid formed decreases, cooling at 24 is reduced so as to allow the temperature of the acid mass to increase. The recycled acid mass, having a higher vapor pressure, thereby causes more water to escape through conduit 22 with the off gases, and thus the concentration of the acid formed increases.

In this manner, the concentration of the continuously recycled sulphuric acid mass is maintained constant, and the incremental portion of acid formed in the absorber is controlled so that its concentration is equal to that of the recycled mass.

The cooling of the sulphuric acid solution, before arriving at the top of the absorber 20, is assured by one or more exchangers 24. Graphite exchangers are particularly suitable due to the corrosive nature of the solution. In the installation illustrated, an exchanger 24 serves to reheat the demineralized water which passes into the piping system 25 and travels towards the boiler 12 and 7.

The installation can comprise several absorbers 20 which are mounted in parallel and/or cascade. These are not shown in the instant drawing or description.

The invention is illustrated by the following examples:

*Example 1*

By way of the conduit 1 (FIGURE 1), the residual gases from a Claus sulphur manufacturing unit are introduced into incinerator 5. These gases contain by volume 0.73% $H_2S$, 0.37% $SO_2$, 30% steam, and 18% $CO_2$, the remainder being nitrogen. The rate of flow thereof is 1425 m.³/h., measured at 0°/760 mm. Hg. The gases contain about 5 g. of vesicular sulphur per cubic meter.

Incineration of these gases is accomplished by using a crude natural gas containing by volume 39% $CH_4$, 35% $H_2S$, and 26% $CO_2$, which reaches the burner 4 at the rate of 63 m.³/h. Allowing for the suitable quantity of air admitted through 3, the incinerator 5 is traversed by 2490 m.³/h. of fumes which titrate by volume 1.7% $SO_2$, 20.4% steam, and 4.5% oxygen, the remainder being nitrogen and $CO_2$.

The fumes are at a temperature of 540° C. when they reach the exchanger 6, and this temperature is lowered to 490° C. between the exchangers 6 and 7 and to 410° C. after passing through 7. It is raised to 450° C. when the gases have traversed the four layer catalytic mass within the converter 9. The active agent of the catalyst is vanadium pentoxide. At this point, the content of $SO_3$ in these gases is 1.6%. The passage through the exchanger 12 causes the temperature of the fumes to fall to 275° C., about 30° C. above the dew point of these fumes.

Inside the concentrator 14, the gases flow countercurrent to the 80% sulphuric acid solution introduced through 19 at a rate of 221 kg./hr. This solution is at a temperature of 160° C. at the inlet at the top of 14, and it is heated to 250° C. and concentrated to 94% when it leaves the concentrator at 16. This sulphuric acid is collected in the tank 17 at an hourly production rate of 186 kg.

The gases leave the concentration chamber 14 through the conduit 18 and enter the absorber 20 at 245° C., which is their dew point. The hourly weight of $SO_3$ entering the absorber is $2490 \times 1.6/100 = 39.84$ m.³;

$$39.8 \text{ m.}^3 \times 3.60 \text{ kg./m.}^3 = 143.42 \text{ kg.}$$

(3.60 being the weight of one m.³ of $SO_3$ at standard conditions).

The 186 kg. of 94% acid collected per hour in tank 17 corresponds to 218.5 kg. at 80%. As the rate of flow of 80% acid into concentrator 14 is 221 kg. per hour, $$221 - 218.5 = 2.5 \text{ kg.}$$

of such acid which is carried away by the gases leaving the concentrator. The 2.5 kg. of 80% sulphuric acid contains: $2.5 \times 80/100 = 2$ kg. $H_2SO_4$; i.e. $2 \times 80/98 = 1.63$ kg. $SO_3$ (80/98 being the molecular weight ratio of $$SO_3/H_2SO_4)$$

Thus, an amount of 1.63 kg. $SO_3$ enters the absorber 20 per hour, in addition to that contained in the gas. Hence, $143.42 + 1.63 = 145$ kg./h. of $SO_3$ which must be absorbed in the absorber 20.

The water vapor carried by the off-gases, as well as the water vaporized in the concentrator, concurrently enter the absorber.

The amount of water carried by the off-gases equals $(2490 \times 20.4)/100 = 507.96$ m.³.

| | Kg. |
|---|---|
| $507.96 \times 0.804^* =$ | 408.39 |
| The water vaporized in the concentrator is $218.5 - 186 =$ | 32.50 |
| The water carried away with the 2.5 kg. of 80% $H_2SO_4$ $2.5 - 1.63 =$ | 0.87 |
| | 441.76 |

*0.804 is the weight of one standard m.³ of water vapor.

Thus, the total water vapor entering the absorber is:

$$441.76, \text{ or } 441.8 \text{ kg./hr.}$$

In the absorber 20, the off-gases meet the solution of 80% $H_2SO_4$, with which the Raschig rings 21 are sprinkled at the rate of 5,000 kg. of solution per hour.

The 145.0 kg./h. of $SO_3$ entering the absorber combine with $(145.0 \times 18)/80 = 32.5$ kg. of $H_2O$ to produce $145.0 + 32.5 = 177.5$ kg./h. of $H_2SO_4$.

To be brought to a concentration of 80%, these 177.5 kg./h. of $H_2SO_4$ have to be combined with:

$$(177.5 \times 20)/80 = 44.3 \text{ kg. of water}$$

which means that $32.5 + 44.3 = 76.8$ kg. of steam are condensed with these 145.0 kg./h. of $SO_3$.

As the gas entering the absorber carried 441.8 kg./h. of water vapor, the amount of steam escaping from the absorber is thus $441.8 - 76.8 = 364.8$ kg./h.

To maintain a uniform $H_2SO_4$ concentration in the absorber 20, the heat exchanger 24 is used for controlling the temperature within the absorber, in order that the water condensed establishes the concentration of $H_2SO_4$ formed to 80%.

Several ways may be utilized to maintain the $H_2SO_4$ concentration constant at 80%. One such technique involves adjusting the temperature within the absorber by means of the heat exchanger 24, as a function of the composition of the gases which enter the absorber and those which leave the absorber, in order that the desired amount of water may be condensed. The composition of the gases is determined by quantitative analysis.

Suppose that "A" moles of $SO_3$ and "B" moles of water vapor enter the absorber. To transform 1 mole of $SO_3$ into $H_2SO_4$, 1 mole of $H_2O$ is needed (18 g.). To bring 98 g. of pure $H_2SO_4$ to $H_2SO_4$ at 80% $(20 \times 98)/80 = 24.5$ g. of water are needed. Thus, to bring $SO_3$ to $H_2SO_4$ at 80%, a total of 42.5 g. of water are necessary, or $(42.5/18) = 2.36$ moles.

If "C" moles of water leave the absorber, the relation between A, B and C, in order that the concentration of $H_2SO_4$ be kept constant at 80%, is $(B-C)/A = 2.36$. If $(B-C)/A$ is greater than 2.36, the temperature of the $H_2SO_4$ current passing through the exchanger 24 has to be raised so that more water escapes from the absorber, thus increasing C. When $(B-C)/A$ is less than 2.36, the temperature of the $H_2SO_4$ current passing through the exchanger 24 has to be reduced so that less water escapes, thus decreasing C.

Another method by which the concentration of the acid formed in the absorber may be controlled is by regulating the temperature of the exchanger as a function solely of the concentration of the $H_2SO_4$ leaving the absorber. If the concentration is higher than 80%, the temperature is reduced in order that more water be condensed; if it is lower than 80%, the temperature is raised in order to decrease the quantity of water which condenses. Such is a particularly simple and efficient manner of carrying out the invention, as it is easy to ascertain the concentration of the acid at any moment.

The average temperature in the absorber is 150° C., but it can vary between 145° C. and 155° C. The variation of temperature alters the vapor pressure which, in this temperature range, has wide limits (for instance, Perry Chem. Engr. Handbook, p. 362, 4th edition, 1963, indicates that an 80% $H_2SO_4$ solution, in the above temperature range, has vapor pressures of between 104 and 157 mm. of Hg).

It is simple to calculate the vapor pressure in the absorber. The hourly volume of off-gases passing through the absorber is:

2490 (initial gas volume) $-39.84$ ($SO_3$ absorbed from the concentrator) $+ (32.5 + 0.87/0.804$ (water vapor absorbed from the concentrator) $= 2492/$m.³/h.

The amount of water vapor which leaves the absorber at 22 is 365.6 kg./h., as seen above, corresponding to:

$$365.6/0.804 = 454.73 \text{ m.}^3$$

and a vapor pressure of $$(454.73 \times 760)/2492 = 138.6 \text{ mm. Hg}$$

In the above example, therefore, the temperature of the exchanger is maintained at about 97° C., in order that the concentration of $H_2SO_4$ is maintained at 80%, and the average temperature in the absorber at about 150° C.

As to the dew point of the gases, it is not necessary to determine it continuously. A very suitable method consists in fixing the pressure within boiler 12 at such a level that the boiling temperature of water therein is always higher than the dew point calculated from the composition of the gases, whatever the variations of the gaseous steam composition. Then the gases leave the boiler 12 at a temperature higher than their dew point. It is an advantage of this method that corrosion of the boiler through condensed $H_2SO_4$ is avoided.

Example 2

In the same installation as in Example 1 and using the same process, 1425 m.³/h. of residual gas containing 1.1% by volume of sulphur are treated, but the incineration in the apparatus 5 was carried out with 22 m.³/h. of purified natural gas containing practically only methane. The gas leaving the incinerator 5 titrated 0.9% of $SO_2$, and its rate of flow (brought to 0°/760 mm.) was 2370 m.³/h.

The hourly production of 94% sulphuric acid was 89 kg., and that of steam was 400 kg.

Example 3

By way of conduit 1, not only 1425 m.³/h. of residual gas from Claus units, as in the preceding examples, but, in addition, 260 m.³/h. of a gas containing by volume 9% of $SO_2$ and 12% of $O_2$ were caused to enter the incinerator 5, which was heated with 26.7 m.³/h. of pure methane; it delivered a gas containing 1.8% of $SO_2$ at the rate of 2430 m.³/h., which passed to the converter 9. The hourly production of 94% sulphuric acid was 192 kg., and that of steam at 24 kg./cm.² was 475 kg.

In general, when the concentration of the solution of sulphuric acid within the absorber 20 is about 80% $H_2SO_4$ by weight, e.g., 75% to 85%, the temperature of the gas entering the bottom of concentrator 14 may be adjusted to from 270° to 280° C. (about 10° to 40° above its dew point), and the flow of the solution through concentrator 14 controlled so that the gas stream leaves the concentrator at its dew point, while the temperature of the concentrated solution which leaves through 16 is about 245° to 255° C.

It will be understood that various changes may be made in the specific parameters of the process and apparatus described hereinabove without departing from the scope of the present invention. Accordingly, it is intended that the preceding description is illustrative only and should not be construed in a limiting sense.

The embodiments of the invention in which an exclusive privilege or property is claimed are defined as follows:

1. In a process for the preparation of concentrated sulphuric acid by the absorption of a hot, humid gaseous stream containing sulphuric oxide in an aqueous sulphuric acid solution, the improvement comprising:
   (a) continuously passing said gaseous stream through an absorber zone countercurrent to said sulphuric acid solution to form an incremental volume of sulphuric acid therein;
   (b) continuously recycling said solution through the absorber zone and regulating the temperature of the recycled stream to maintain the concentration of the sulphuric acid in said solution substantially constant;
   (c) continuously removing the portion of said solution containing said incremental volume of sulphuric acid from said absorber zone;
   (d) continuously passing said portion of the sulphuric acid solution through a concentrator zone countercurrent to said gaseous stream, prior to introduction of the latter into said absorber zone, to form said concentrated sulphuric acid; and
   (e) recovering said concentrated sulphuric acid.

2. The process as defined in claim 1, in which the aqueous sulphuric acid solution continuously recycled through the absorber zone in step (b) contains from 75% to 90% $H_2SO_4$ by weight, and in which the gaseous stream continuously passed through the concentrator zone in step (e) contains from 0.8% to 9% by volume of $SO_3$.

3. The process as defined in claim 1, in which the temperature of the sulphuric oxide-containing gaseous stream continuously passed through the concentrator zone in step (d) is decreased during passage through such zone, from above its dew point to approximately its dew point, the gaseous stream entering the absorber zone in step (a) at the latter temperature.

4. The process as defined in claim 1, in wsich the amount of the sulphuric acid solution continuously recycled through the absorber zone in step (b) is from 20 to 30 times the amount of the portion of said solution continuously removed from the absorber zone in step (c).

5. The process as defined in claim 1, in which heat is recovered from said gaseous stream in steps (a) and (d) to increase the temperature of the aqueous sulphuric acid solution passed through the absorber zone and effect concentration of said portion of said solution passed through the concentrator zone, the gaseous stream concurrently being cooled from a temperature above its dew point, prior to introduction into said concentrator zone in step (d), to approximately its dew point upon introduction into the absorber zone in step (a).

6. A process for the preparation of concentrated sulphuric acid by the absorption of a hot, humid gaseous stream containing from 0.8% to 9% by volume $SO_3$ in an aqueous sulphuric acid solution containing from 75% to 90% by weight $H_2SO_4$, which comprises;
   (a) continuously feeding said gaseous stream, while maintaining the same at a temperature approximating its dew point, into an absorber zone;
   (b) continuously passing said gaseous stream through the absorber zone countercurrent to said sulphuric acid solution, water and $SO_3$ in said gaseous stream being absorbed in said solution and forming an incremental volume of sulphuric acid therein;
   (c) continuously recycling said solution through the absorber zone and cooling the recycled stream to adjust the partial pressure of the water vapor in the absorber zone and thereby maintain the concentration of the sulphuric acid in said solution substantially constant within the range of from 75% to 90% $H_2SO_4$ by weight;
   (d) continuously removing the portion of said solution containing said incremental volume of sulphuric acid from said absorber zone;
   (e) continuously passing said portion of the sulphuric acid solution through a concentrator zone countercurrent to said gaseous stream prior to introduction of the latter into said absorber zone, the gaseous stream initially being maintained at a temperature of from 10° to 40° C. above its dew point to effect partial vaporization of the water in the sulphuric acid solution portion and thereby form said concentrated sulphuric acid; and
   (f) recovering said concentrated sulphuric acid.

References Cited
UNITED STATES PATENTS 1,233,627 7/1917 Weber _____ 23—167
2,042,675 6/1936 Merriam _____ 23—175

EDWARD J. MEROS, *Primary Examiner.*

OSCAR R. VERTIZ, *Examiner.*

A. J. GREIF, *Assistant Examiner.*